United States Patent [19]

Baldwin et al.

[11] 3,852,292

[45] Dec. 3, 1974

[54] 2-(PYRIDYL)-IMIDAZOLE-4,5-DICARBOXYLIC ACID AND DERIVATIVES

[75] Inventors: John J. Baldwin, Lansdale; Frederick C. Novello, Berwyn, both of Pa.

[73] Assignee: Merck & Co., Inc., Rahway, N.J.

[22] Filed: July 30, 1973

[21] Appl. No.: 383,851

Related U.S. Application Data

[62] Division of Ser. No. 250,505, May 5, 1972, Pat. No. 3,812,136.

[52] U.S. Cl. ... 260/295 R, 260/294.9, 260/295 AM, 260/309, 424/263, 424/266, 424/273

[51] Int. Cl............................................. C07d 31/34

[58] Field of Search ................................. 260/295 R

[56] References Cited
UNITED STATES PATENTS
3,691,178   9/1972   Baldwin et al. ................... 260/294.9

Primary Examiner—Alan L. Rotman

[57] ABSTRACT

This relates to a new class of imidazoles which are substituted at the 2-carbon by an aryl or heterocyclic moiety and which are substituted at the 4 and 5 carbons by cyano, carboxy, alkoxycarbonyl, carbamoyl or N-substituted carbamoyl. These products have utility as anti-hyper-uricemic agents in the treatment of gout.

4 Claims, No Drawings

2-(PYRIDYL)-IMIDAZOLE-4,5-DICARBOXYLIC ACID AND DERIVATIVES

This is a division of application Ser. No. 250,505 filed May 5, 1972, now U.S. Pat. No. 3,812,136, dated May 5, 1972.

This invention relates to a new class of imidazoles which have utility as anti-hyperuricemic agents in the treatment of gout. These products inhibit the action of xanthine oxidase in the body and thus effectively reduce the concentration of uric acid in serum and urine.

Gout is a condition affecting humans and lower animals which is characterized by perversion of the purine metabolism resulting in an excess of uric acid in the blood, attacks of acute arthritis and formation of chalky deposits in the cartilages of the joints. These deposits are made up chiefly of urates, or uric acid.

Uric acid serves no biochemical function in the body and is merely an end product of purine metabolism. It is well known in the art that the purine bases adenine and guanine, which play key roles in a wide variety of chemical processes, both give rise to uric acid in the body. Adenylic acid and guanylic acid are converted to the free purine bases by destructive metabolic enzymes. A portion of the free purine bases is converted to purine ribonucleotides and the remainder is degraded to the free bases xanthine and hypoxanthine. A single enzyme, xanthine oxidase, converts both xanthine and hypoxanthine to uric acid for excretion.

Although human purine biosynthesis can be inhibited at the stage of formyl glycinimide ribotide by the glutamine antagonists azaserine and 6-diazo-5-oxo-1-norleucine, a high incidence of undesirable side effects precludes their being used clinically for this purpose. In recent years, substantial progress has been made in attempting to control the excessive levels of uric acid in patients afflicted with gout through the use of pharmaceutical agents. Uric acid synthesis has been effectively blocked by the use of allopurinol, i.e., 4-hydroxypyrazolo-[3,4-d]-pyrimidine, a compound which is a structural isomer of hypoxanthine. Allopurinol acts as a specific inhibitor of the enzyme xanthine oxidase, which is responsible for the conversion of both hypoxanthine and xanthine to uric acid. As a direct result of the administration of this compound to patients afflicted with gout, part of the uric acid which would normally end up in the urine is replaced by the oxypurines, hypoxanthine and xanthine, thus greatly reducing the content of uric acid in serum and urine. Azathioprine has also been used to inhibit excessive purine synthesis, and thus reduce the abnormally high amounts of uric acid found in the serum and urine of afflicted patients. Other compounds, such as acetylsalicylic acid, thiophenylpyrazolidine and phenylbutazone have also been employed in the treatment of gout. Many of the existing compounds used in the treatment of gout, however, relieve the inflammation and other symptoms connected therewith but have no effect on the conditions which give rise to gouty arthritis or hyperuricemia. Thus, there is still a need for compounds which can be employed in the prophylactic treatment of gout as well as for the treatment of other abnormal conditions associated with hyperuricemia.

An object of this invention is to describe a novel class of tri-substituted imidazoles which are effective antigout and anti-hyperuricemic agents and methods of preparing same. The products of this invention are compounds of the following formula:

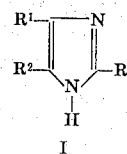

I wherein R is naphthyl such as 1-or 2-naphthyl, pyridyl such as 2-, 3- or 4-pyridyl or mono-substituted mononuclear aryl of the formula:

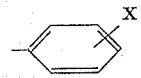

wherein X is halo, for example, chloro, bromo, fluoro or iodo and the like, lower alkoxy, for example, methoxy, ethoxy, propoxy and the like or lower alkanamido, for example, formamido, acetamido or propionamido and the like; and $R^1$ and $R^2$ are the same or different and represent cyano, carboxy, lower alkoxycarbonyl, for example, methoxycarbonyl, ethoxycarbonyl or propoxycarbonyl and the like, carbamoyl or N-lower alkylcarbamoyl such as N-methyl-, N-ethyl-, N-propyl or N-butylcarbamoyl; and the non-toxic, pharmacologically acceptable acid addition and quaternary ammonium salts thereof.

A preferred embodiment of this invention comprises those 2-(4-pyridyl) imidazoles of formula II, infra, wherein the 4 and 5 positions of the imidazole nucleus are both substituted by carboxy or cyano or, in the alternative, by carbamoyl and cyano:

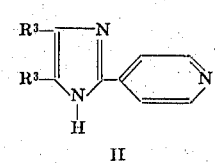

II wherein the $R^3$ moieties both represent carboxy or cyano at the same time or, taken separately, one of the $R^3$ radicals is cyano and the remaining $R^3$ is carbamoyl; including the non-toxic alkali metal and alkaline earth metal and quaternary ammonium salts thereof. Typical of the products embraced by this preferred subgroup are, for example, 2-(4-pyridyl)-imidazole-4,5-dicarboxylic acid, 4,5-dicyano-2-(4-pyridyl)-imidazole and 4(5)-cyano-2-(4-pyridyl)-5(4)-imidazolecarboxamide. This class of products exhibits particularly good antihyperuricemic activity and represents a preferred subgroup of products within the scope of this invention.

The 4,5-dicarboxyimidazoles of this invention are prepared by treating tartaric acid dinitrate with either an aralkaldehyde or with a pyridinecarboxaldehyde, in the presence of ammonium hydroxide, followed by treatment with an acid such as a mineral acid:

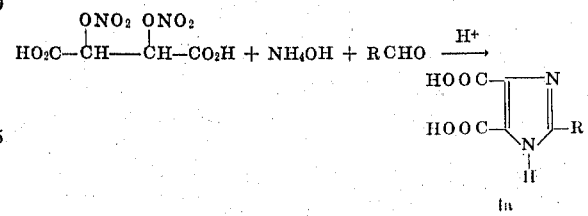

Ia wherein R is as defined above. In practice, it is desirable to conduct the process in the cold as, for example, at temperatures in the range of from about −10°C. to +10°C., but following the addition of the aldehyde the mixture can be allowed to warm to room temperature.

The 4,5-dicarboxyimidazole (Ia) obtained via the above method is the precursor for the remaining products of this invention. Thus, for example, the diesters of the said 4,5-dicarboxyimidazole (Ia) are obtained by simply treating the latter with a lower alkanol in the presence of a suitable acid as, for example, in the presence of a mineral acid such as hydrochloric acid:

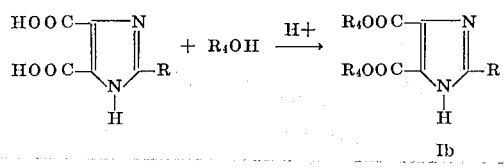

wherein $R_4OH$ is a lower alkanol such as methanol, ethanol or propanol, etc., $R^4$ is lower alkyl and R is as defined above.

The mono-ester analog (Ic, infra) of the dicarboxylate described above as formula Ib, is obtained by simply treating the latter (Ib) with an equivalent amount of a base as, for example, with an alkali metal hydroxide followed by treatment with a mineral acid:

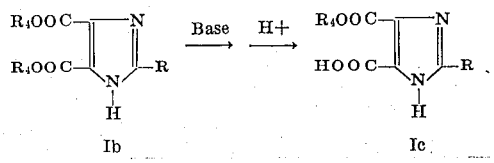

wherein R and $R^4$ are as defined above.

The carboxamides of this invention, corresponding to formula I, supra, wherein either or both of $R^1$ and $R^2$ represent carbamoyl or N-lower alkylcarbamoyl, are derived from the corresponding ester precursors. Thus, for example, the 4(5)-carbamoylimidazole-5(4)-carboxylic acid derivatives (Id, infra) are obtained by treating a 4(5)-carboalkoxyimidazole-5(4)-carboxylic acid (Ic) with concentrated ammonium hydroxide, followed by treatment with a suitable acid such as a mineral acid:

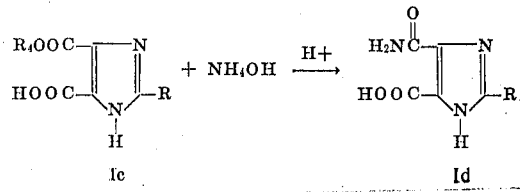

wherein R and $R_4$ are as defined above.

Likewise, the 4,5-dicarbamoylimidazoles (Ie, infra) are obtained from their corresponding dicarboxylate precursors (Ib) by treatment with ammonia in a suitable solvent, preferably, methanol:

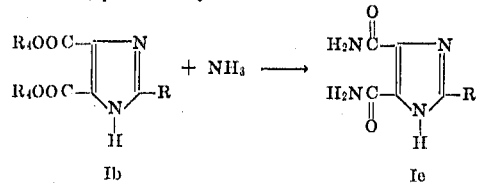

wherein R and $R_4$ are as defined above. And the N-lower alkylcarbamoylimidazoles are obtained in a manner similar to that described above for the preparation of the carbamoyl derivatives (Ie) except that the appropriate lower alkylamine is substituted for ammonia in an otherwise similar process.

The 4(5)-cyano-5(4)-carbamoylimidazoles and 4,5-dicyanoimidazoles (If, infra) are derived from their 4,5-dicarbamoylimidazole precursors (Ie) by treating the latter with phosphorus oxychloride, followed by treatment with a base such as ammonium hydroxide to neutralize any excess acid. This method can be used to prepare either the monocyano or dicyano imidazole derivatives depending upon the reaction time employed. The following equation, wherein phosphorus oxychloride reacts with 4,5-dicarbamoylimidazole (Ie), illustrates this method of preparation; however, it is to be understood that when a shorter reaction time is employed the corresponding 4(5)-cyano-5(4)-carbamoyl-2-imidazole is obtained:

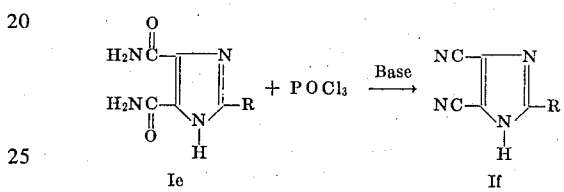

wherein R is as defined above.

Included within this invention are the non-toxic, pharmacologically acceptable salts of the instant products (I) including the quaternary ammonium and acid addition salts. In practice, the quaternary salts are obtained by treating a 2-pyridylimidazole product of this invention (formula I, supra, wherein R is pyridyl) with a lower alkyl halide such as methyl iodide, ethyl iodide or propyl iodide in a suitable solvent such as methanol, ethanol or dimethylformamide.

The acid addition salts include both metal salts such as the alkali metal and alkaline earth metal salts and salts of mineral acids as, for example, the hydrochloride and hydrobromide salts. The hydrogen atom at position 1 of the imidazole ring (I) is acidic in character and reacts readily with various bases such as the alkali metal and alkaline earth metal hydroxides and carbonate as, for example, sodium and potassium hydroxide, sodium carbonate, potassium carbonate and calcium carbonate to afford the corresponding salts. Likewise, the nitrogen atom in the 2-pyridylimidazoles of this invention will, upon treatment with an acid such as hydrochloric acid or hydrobromic acid, afford the corresponding hydrochloride or hydrobromide.

The foregoing and other equivalent methods for the preparation of the salts of the instant products (I) will be apparent to those having ordinary skill in the art and, to the extent that the said derivatives are both non-toxic and physiologically acceptable to the body system, the said salts are the functional equivalents of the free imidazole product (I).

The examples which follow illustrate the imidazole products (I) of this invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

2-(4-Pyridyl)imidazole-4,5-dicarboxylic Acid

Sulfuric acid (200 ml.) is added dropwise to a solution of d-tartaric acid (50 g., 0.33 mole) in concentrated nitric acid (108 ml.) and 90% nitric acid (108 ml.) is added while maintaining the mixture at 38°C. The reaction mixture is stirred at 0°C. for 2 hours and the resulting tartaric acid dinitrate solid is filtered. The crude tartaric acid dinitrate is added with stirring to crushed ice (400 g.) and to the resulting solution is added concentrated ammonium hydroxide (250 ml.) dropwise at −5 to −10°C. An additional 50 ml. of concentrated ammonium hydroxide is then added followed by the dropwise addition of 4-pyridinecarboxaldehyde (40 g., 0.37 mole). The reaction mixture is cooled in ice and allowed to warm to 27°C. over 16 hours. The resulting solid is filtered, dissolved with water and acidified with hydrochloric acid to yield 30 g. of 2-(4-pyridyl)imidazole-4,5-dicarboxylic acid which decomposes at 308°C.

Analysis for $C_{10}H_7N_3O_4$:

Calc.: C, 51.51; H, 3.03; N, 18.02
Found: C, 51.18; H, 3.21; N, 17.70

By substituting the appropriate carboxaldehyde for the 4-pyridinecarboxaldehyde of Example 1 and following the procedure described therein the products of Table I, infra, may be obtained. The following equation and table illustrate the process of Example 1 and the products obtained thereby:

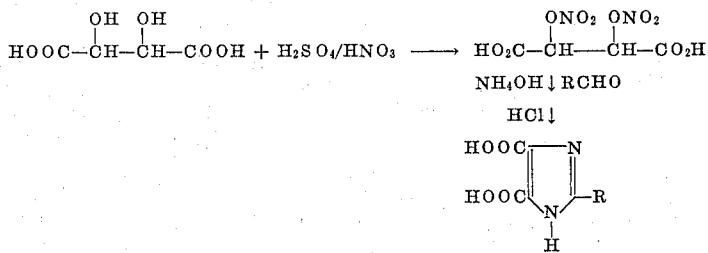

EXAMPLE 10

Dimethyl 2-(4-Pyridyl)imidazole-4,5-dicarboxylate

Hydrochloric acid was bubbled into a suspension of 2-(4-pyridyl)imidazole-4,5-dicarboxylic acid (30 g.) in methanol (2.2 l.) at reflux for one hour. After an additional hour of reflux the reaction mixture was concentrated to a solid, dissolved in water (500 ml.) and the resulting diester precipitated by the addition of aqueous sodium bicarbonate solution. After recrystallization from water 27 g. of dimethyl 2-(4-pyridyl)imidazole-4,5-dicarboxylate was obtained which decomposed at 196°C.

Analysis for $C_{12}H_{11}N_3O_4$:

Calc.: C, 55.17; H, 4.24; N, 16.09;
Found: C, 55.10; H, 4.44; N, 16.39.

In a similar manner dimethyl 2-(3-pyridyl)imidazole-4,5-dicarboxylate may be obtained by substituting 2-(3-pyridyl)imidazole-4,5-dicarboxylic acid for 2-(4-pyridyl)-imidazole-4,5-dicarboxylic acid in the foregoing method and otherwise following the procedure described therein. The dimethyl 2-(3-pyridyl)imidazole-4,5-dicarboxylate product has a melting point of 212°–214°C. and gave the following analysis:

Analysis for $C_{12}H_{11}N_3O_4$:

Calc.: C, 55.17; H, 4.24; N, 16.09;
Found: C, 55.01; H, 4.23; N, 16.04.

TABLE I

| Ex. | R | M.P., °C. | Calculated C | Calculated H | Calculated N | Found C | Found H | Found N |
|---|---|---|---|---|---|---|---|---|
| 2 | –C₆H₄–CH₃ | 274 | 58.43 | 4.09 | 11.38 | 58.50 | 3.89 | 11.35 |
| 3 | –C(CH₃)₃ | 262.5–263.5 | 50.94 | 5.70 | 13.20 | 51.11 | 5.77 | 13.48 |
| 4 | –CH(CH₃)₂ | 263 | 48.48 | 5.09 | 14.14 | 48.71 | 5.12 | 14.34 |
| 5 | –C₆H₄–Cl | 262–264 | 49.55 | 2.65 | 10.51 | 49.41 | 2.60 | 10.74 |
| 6 | –C₆H₄–NH–COCH₃ | 272 | 53.98 | 3.83 | ........ | 53.64 | 3.81 | ........ |
| 7 | naphthyl | 267–269 | 63.83 | 3.57 | 9.93 | 64.08 | 3.50 | 10.22 |
| 8 | –C₆H₄–OCH₃ | 265–267 | 54.96 | 3.84 | 10.68 | 55.20 | 3.84 | 10.70 |
| 9 | pyridyl | 302–303 | 51.51 | 3.03 | 18.02 | 51.39 | 3.27 | 17.91 |

EXAMPLE 11

2-(4-Pyridyl)imidazole-4,5-dicarboxamide

A mixture of dimethyl 2-(4-pyridyl)imidazole-4,5-dicarboxylate (10 g.) and ammonia (15 g.) in methanol (200 ml.) was heated at 120°C. for 18 hours. The resulting solid was filtered and after recrystallization from a mixture of N,N-dimethylformamide and water 6.2 g. of 2-(4-pyridyl)imidazole-4,5-dicarboxamide was obtained which melted above 300°C.

Analysis for $C_{10}H_9N_5O_2$:
 Calc.: C, 51.94; H, 3.92; N, 30.29;
 Found: C, 51.93; H, 3.92; N, 30.37.

EXAMPLE 12

4,5-Dicyano-2-(4-pyridyl)imidazole

A suspension of 2-(4-pyridyl)imidazole-4,5-dicarboxamide (15 g.) in phosphorus oxychloride (200 ml.) was refluxed for eight hours. Phosphorus oxychloride was removed from the solution under reduced pressure and the resulting residue was dissolved in water and excess acid was neutralized with ammonium hydroxide. There was thus obtained 4,5-dicyano-2-(4-pyridyl)imidazole in the form of a precipitate which, upon filtration, yielded 12.5 g. of product. After purification by chromatography and recrystallization from a mixture of acetonitrile and water, substantially pure 4,5-dicyano-2-(4-pyridyl)imidazole with a melting point above 300°C. was obtained.

Analysis for $C_{10}H_5N_5$:
 Calc.: C, 61.53; H, 2.58; N, 35.88;
 Found: C, 61.06; H, 2.77; N, 35.53.

Examples 10–12 describe methods by which the 4,5-dicarboxy groups in the 2-(4-pyridyl)imidazole-4,5-dicarboxylic acid of Example 1 can be converted to the corresponding ester, amide and cyano derivatives. Thus, Example 10 describes the conversion of the said dicarboxy derivative to its diesterified counterpart and Examples 11–12 describe the conversion of the said diester to the corresponding amido and cyano derivatives. By following these procedures all of the instant products may be obtained. The following equation and Table II illustrate the processes of Examples 10–12 and the products derived therefrom. The starting materials in these syntheses are the products of Examples 1–9.

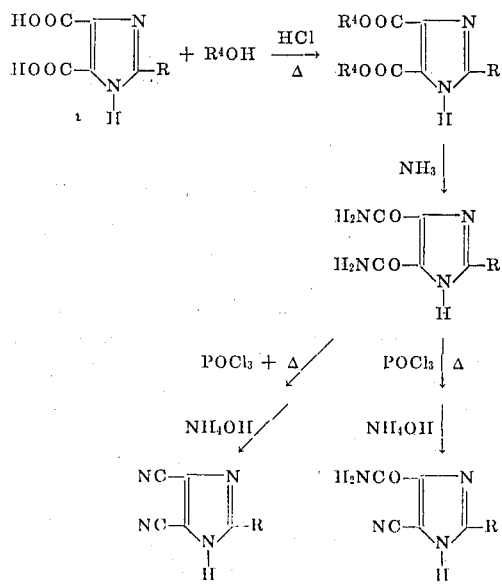

TABLE II

| Example number | R | R⁴ |
|---|---|---|
| 13 | –C₆H₄–CH₃ | –C₂H₅ |
| 14 | –C(CH₃)₃ | –(CH₂)₂CH₃ |
| 15 | –CH(CH₃)₂ | –C₂H₅ |
| 16 | –C₆H₄–Cl | –CH₃ |
| 17 | –C₆H₄–NH–C(O)CH₃ | –(CH₂)₃CH₃ |
| 18 | –naphthyl | –C₂H₅ |
| 19 | –C₆H₄–OCH₃ | –CH₃ |
| 20 | –pyridyl | –CH₃ |

EXAMPLE 21

4(5)-Carbomethoxy-2-(p-chlorophenyl)imidazole-5(4)-carboxylic Acid

Sodium hydroxide (1.54 g., 0.038 mole) in water (40 ml.) is added with stirring to a solution of dimethyl (2-p-chlorophenyl)imidazole-4,5-dicarboxylate (11.3 g., 0.038 mole) in 50 percent methanol (154 ml.). The reaction mixture was refluxed for 1.5 hours, cooled and acidified to congo red with hydrochloric acid. 4(5)-Carbomethoxy-2-(p-chlorophenyl)-imidazole-5(4)-carboxylic acid precipitated and this product was filtered to afford 5.3 g. of 4(5)-carbomethoxy-2-(p-chlorophenyl)imidazole-5(4)-carboxylic acid.

EXAMPLE 22

4(5)-Cyano-2-(4-pyridyl)-5(4)-imidazolecarboxamide

A suspension of 2-(4-pyridyl)imidazole-4,5-dicarboxamide (5 g.) in phosphorus oxychloride (70 ml.) was refluxed for five hours. The resulting solution was concentrated under pressure to afford a residue which was dissolved in water and the excess acid was neutralized with ammonium hydroxide. On cooling a solid crystallized and this material was filtered to afford a crude product (4.8 g.) which was chromatographed on silica gel to afford 4(5)-cyano-2-(4-pyridyl)-5(4)-imidazolecarboxamide. After recrystallization from a mixture of acetonitrile and water there was obtained 550 mg. of 4(5)-cyano-2-(4-pyridyl)-5(4)-imidazole-carboxamide which melted above 300°C.

Analysis for $C_{10}H_7N_5O$:
 Calc.: C, 56.33; H, 3.31; N, 32.85;
 Found: C, 56.19; H, 3.27; N, 32.86.

EXAMPLE 23

2-(p-Chlorophenyl)-[4(5)-N-methylcarbamoyl]imidazole-4(4)-carboxylic Acid

4(5)-Carbomethoxy-2-(p-chlorophenyl)imidazole-5(4)-carboxylic acid (300 mg.) is dissolved in 40 percent aqueous methylamine (7 ml.). The reaction mixture is allowed to stand at room temperature for 16 hours and is then concentrated under reduced pressure. The resulting solid is dissolved in water and the solution acidified with hydrochloric acid. There is thus obtained 2-(p-chlorophenyl)-[4(5)-N-methylcarbamoyl]-imidazole-5(4)-carboxylic acid as a precipitate and this product is recrystallized from acetonitrile to afford 150 mg. or 2-(p-chlorophenyl)-[4(5)-N-methylcarbamoyl]imidazole-5-(4)-carboxylic acid.

EXAMPLE 24

2-(p-Chlorophenyl)-[4(5)-N-ethylcarbamoyl-]imidazole-5(4)-carboxylic Acid

By substituting ethylamine for the methylamine of Example 24 and following the procedure described therein, the product 2-(p-chlorophenyl)-[4(5)-N-ethylcarbamoyl]-5(4)-carboxylic acid is obtained.

EXAMPLE 25

2-(p-Chlorophenyl)-[4(5)-N-allylcarbamoyl]imidazole-5(4)-carboxylic Acid

By substituting allylamine for the methylamine of Example 24 and following the procedure described therein, there is thus obtained 2-(p-chlorophenyl)-[4(5)-N-allylcarbamoyl]imidazole-5(4)-carboxylic acid.

EXAMPLE 26

2-(p-Chlorophenyl)-[4(5)-N-cyclopropylcarbamoyl-]imidazole-5(4)-carboxylic Acid

By substituting cyclopropylamine for the methylamine of Example 24 and following the procedure described therein, there is thus obtained 2-(p-chlorophenyl)-[4(5)-N-cyclopropylcarbamoyl]imidazole-5(4)-carboxylic acid.

The products (I) of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of an imidazole product (I) of this invention or a suitable acid addition salt, or quaternary ammonium salt thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 27

Dry-filled capsules containing 50 mg. of active ingredient per capsule

| | Per Capsule |
|---|---|
| 4,5-Dicyano-2-(4-pyridyl)-imidazole | 50 mg. |
| Lactose | 144 mg. |
| Magnesium Stearate | 6 mg. |
| Capsule (Size No. 3) | 200 mg. |

The 4,5-dicyano-2-(4-pyridyl)imidazole is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the imidazole products of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

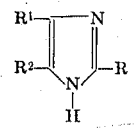

wherein R is pyridyl

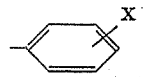

and $R^1$ and $R^2$ are the same or different and represent carboxy, lower alkoxycarbonyl, and the non-toxic-pharmacologically acceptable acid addition salts thereof.

2. The compound of claim 1 wherein R is 4-pyridyl.
3. 2-(4-Pyridyl)imidazole-4,5-dicarboxylic Acid.
4. The compound of claim 1 wherein R is 3-pyridyl.

* * * * *